(12) United States Patent
Kudanowski et al.

(10) Patent No.: US 8,502,485 B2
(45) Date of Patent: Aug. 6, 2013

(54) MOTOR DRIVE CIRCUITRY

(75) Inventors: Maciej Kudanowski, Solihull (GB); Andrew McLean, Oldbury (GB)

(73) Assignee: TRW Automotive US LLC, Livonia, MI (US)

( * ) Notice: Subject to any disclaimer, the term of this patent is extended or adjusted under 35 U.S.C. 154(b) by 90 days.

(21) Appl. No.: 13/263,611

(22) PCT Filed: Apr. 7, 2010

(86) PCT No.: PCT/GB2010/050597
§ 371 (c)(1),
(2), (4) Date: Dec. 8, 2011

(87) PCT Pub. No.: WO2010/116182
PCT Pub. Date: Oct. 14, 2010

(65) Prior Publication Data
US 2012/0086373 A1 Apr. 12, 2012

(30) Foreign Application Priority Data
Apr. 7, 2009 (GB) .................................. 0906020.3

(51) Int. Cl.
*H02P 6/12* (2006.01)
(52) U.S. Cl.
USPC ............. 318/400.22; 318/254.1; 318/400.03; 361/33; 361/37; 363/56.05
(58) Field of Classification Search
USPC ....... 318/400.22, 400.03, 254.1, 139; 361/31, 361/33, 37, 54, 138; 363/56.05
See application file for complete search history.

(56) References Cited

U.S. PATENT DOCUMENTS

| 4,437,133 | A | * | 3/1984 | Rueckert | ........................ 361/33 |
| 4,471,421 | A | * | 9/1984 | Brown et al. | ................... 363/54 |

(Continued)

FOREIGN PATENT DOCUMENTS

| DE | 102008034326 A1 | 2/2009 |
| DE | 102008034790 A1 | 2/2009 |

(Continued)

OTHER PUBLICATIONS

Search Report for Application No. GB0906020.3 dated Aug. 7, 2009.

(Continued)

*Primary Examiner* — Paul Ip
(74) *Attorney, Agent, or Firm* — MacMillan, Sobanski & Todd, LLC

(57) ABSTRACT

A motor drive circuit includes a positive and a negative supply rail for connection to a battery (104), a motor drive circuit including a plurality of motor drive subcircuits which each selectively permit current to flow into or out of a respective phase of a multi-phase motor (101) in response to control signals from a motor control circuit, and a switching means including at least one switch which is in series with a respective phase of the motor which is normally closed to permit the flow of current to and from the subcircuit to the respective motor phase. A fault signal detecting means (160) detects at least one fault condition and, in the event of a fault condition being detected, causes the at least one switch to open. A snubber circuit (150) is associated with the motor and is arranged so that following the opening of the switch, energy stored in the motor windings is diverted away from the switching means through the snubber circuit to the battery.

13 Claims, 3 Drawing Sheets

U.S. PATENT DOCUMENTS

| | | | |
|---|---|---|---|
| 4,740,881 A * | 4/1988 | Park et al. | 363/138 |
| 5,111,374 A * | 5/1992 | Lai et al. | 363/37 |
| 5,123,746 A * | 6/1992 | Okado | 363/37 |
| 5,172,310 A * | 12/1992 | Deam et al. | 363/144 |
| 5,710,698 A * | 1/1998 | Lai et al. | 363/56.05 |
| 6,115,270 A * | 9/2000 | Yamane et al. | 363/40 |
| 6,169,672 B1 * | 1/2001 | Kimura et al. | 363/56.05 |
| 6,291,987 B1 * | 9/2001 | Dean et al. | 324/764.01 |
| 6,577,086 B2 | 6/2003 | Sebastian | |
| 6,653,806 B1 * | 11/2003 | Ono | 318/375 |
| 7,429,840 B2 * | 9/2008 | Pollock et al. | 318/254.1 |
| 7,589,942 B2 * | 9/2009 | Kumfer et al. | 361/31 |
| 7,837,004 B2 | 11/2010 | Yasuda | |
| 7,848,121 B2 * | 12/2010 | Kojori | 363/37 |
| 8,233,258 B2 * | 7/2012 | Wei et al. | 361/111 |
| 2006/0197396 A1 * | 9/2006 | Pollock et al. | 310/166 |
| 2007/0249461 A1 | 10/2007 | Tsuji et al. | |
| 2008/0094866 A1 * | 4/2008 | Bauman et al. | 363/50 |
| 2008/0285314 A1 * | 11/2008 | Kojori | 363/37 |
| 2008/0310057 A1 * | 12/2008 | Kumfer et al. | 361/31 |
| 2010/0007293 A1 * | 1/2010 | Meadors et al. | 318/139 |
| 2010/0008113 A1 * | 1/2010 | Kuno et al. | 363/95 |
| 2010/0177452 A1 * | 7/2010 | Wei et al. | 361/111 |
| 2010/0265740 A1 * | 10/2010 | Zargari et al. | 363/17 |
| 2011/0006710 A1 * | 1/2011 | Kondo et al. | 318/400.03 |
| 2012/0069604 A1 * | 3/2012 | Yagyu et al. | 363/20 |

FOREIGN PATENT DOCUMENTS

| | | |
|---|---|---|
| EP | 1462337 A1 | 9/2004 |
| EP | 1738990 A2 | 1/2007 |

OTHER PUBLICATIONS

International Search Report for PCT/GB2010/050597 dated Aug. 11, 2010.

* cited by examiner

MOTOR DRIVE CIRCUITRY

CROSS-REFERENCE TO RELATED APPLICATIONS

This application is the National Phase of International Application PCT/GB2010/050597 filed Apr. 7, 2010, which designated the U.S. That International Application was published in English under PCT Article 21(2) on Oct. 14, 2010 as International Publication Number WO 2010/116182A1. PCT/GB2010/050597 claims priority to U.K. Application No. 0906020.3 filed Apr. 7, 2009. Thus, the subject nonprovisional application also claims priority to U.K. Application No. 0906020.3 filed Apr. 7, 2009. The disclosures of both applications are incorporated herein by reference.

This invention relates to improvements in motor drive circuitry, especially but not exclusively for use in electric power assisted steering assemblies.

Electric power assisted steering systems are known of the kind in which an electric motor applies assistance torque to a part of the steering in order to assist the driver of the vehicle in turning the wheel. The motor may typically act upon the steering column or may act upon the steering rack, through a reduction gearbox. A measurement of the torque applied to the steering apparatus by the driver when turning the wheel is passed to a processor which produces a torque demand signal which is in turn used to control the motor to produce the required assistance torque. Applying an assistance torque of the same sense as the driver applied torque reduces the amount of effort needed to turn the wheel.

The motor, which may be a star or wye connected motor, such as a multiphase permanent magnet motor, is controlled by a motor control circuit and a motor drive circuit. The motor drive circuit comprises switches which can be opened and closed to connect the phases of the motor to a DC source, such as a battery or an earth, in response to a control pattern provided by the control circuit. Specifically, each phase is connected to a positive supply rail through a top transistor which when turned on connects the motor phase to a battery positive terminal connected to the positive supply rail. Similarly, each phase is connected through a bottom transistor to a negative supply rail through a bottom transistor. When switched on the bottom transistor connects the phase to the negative rail which is in turn connected to a battery negative or earth, The two transistors-top and bottom-form one arm of a multiple arm bridge circuit that is the heart of the drive circuit. By opening and closing the switches it is possible to selectively and independently route current through each phase of the motor.

The control circuit comprises a digital or analogue circuit or some combination of both. The function of the control circuit is to supply control signals to the bridge transistors to open and close them in a pattern which in turn causes the current to flow through the phases as required for a given motor torque and speed. Generally the pattern will be set by the control circuit according to the motor position and the torque measured in the steering system by a torque sensor. Typically the pattern for each arm of the bridge comprises a pulse width modulated waveform.

A problem with such a system is that a fault mode can arise in which a top transistor in an arm of the bridge and a bottom transistor in another arm of the bridge may both be stuck in the closed position, resulting in a permanent path for DC current from the battery through the positive rail, through at least two phases of the motor and back to the negative rail. This can occur for many reasons, such as a fault in the control circuit resulting in a control pattern being applied to the drive circuit which is incorrectly instructing transistors to stay closed. When such a fault condition occurs the motor resists turning, making it difficult for the driver to turn the wheel.

An example of a typical prior art motor circuit and this type of fault mode is shown in FIG. 1 of the accompanying drawings. A battery supplies power to a 3 phase bridge with top switches 2,3,4 and bottom switches 5,6,7 which feed a 3 phase permanent magnet motor 8. If one top and one bottom switch 2,7 are stuck closed this causes a DC clamp current to flow through two phases of the motor.

Several strategies have been proposed to mitigate the potential hazards caused by this fault condition. A clutch may be provided between the motor and the part of the steering apparatus to which it connects. When the fault is detected the clutch can be opened to disconnect the motor from the rest of the steering. In an alternative strategy it is known to provide a mechanical relay positioned in series with the motor phase windings which can be opened in the event that the fault condition is detected to break the torque-generating current. The relay is normally closed but is opened when the fault is detected, breaking the path of the current. An example of this is shown in FIG. 1 in which a two-pole relay 9 is shown in series with two phases of the motor. However, the provision of such a relay is disadvantageous because of electromechanical device reliability issues, contact resistance variability over life, susceptibility to vibration/temperature and limited inductive load current switching capability.

We are also aware of the teaching of U.S. Pat. No. 6,577,086B2, in which a switch is provided between each arm of the motor drive circuit bridge and its respective phase. This switch is again normally closed but can be opened if a fault condition arises to break the path. However the applicant has appreciated that this arrangement has some significant limitations and it would appear that the circuit is not proposed as a solution to the problem considered here but is in fact suitable only for preventing closed loop short circuits within the motor that arise when current is not flowing. To understand the limitations of the circuit disclosed in U.S. Pat. No. 6,577,086B2, consider a representative automotive application based on a 12 volt supply battery. The fault current that flows when a top and bottom transistor are stuck in the closed position can be a substantial current of 250 Amps or more. Once this fault condition has been detected, any attempt to open the solid state switches will immediately result an "off-state" voltage across the transistor caused by the back emf generated by the motor phase inductance. The voltage developed across the FET drain-source (D-S) terminals in this condition may be sufficient to cause the FET to enter an avalanche breakdown condition. In this situation the high currents combined with the high voltage across the transistor D-S terminals causes significant energy to dissipated in the transistor. This avalanche energy can typically reach 5 Joules or more. This level of energy dissipation exceeds the capabilities of most commercially available FET switches which are economically viable.

According to a first aspect the invention provides a motor circuit comprising:

a positive supply rail for connection to the positive side of a battery or other DC source, a negative supply rail for connection to the negative side of a battery or other DC source, a motor drive circuit comprising a plurality of motor drive sub circuits which each selectively permit current to flow into or out of a respective phase of a multi-phase motor connected to the motor circuit in response to control signals, a motor control circuit which generates the control signals, a switching means located in series to the phases of the motor, the switching means comprising at least one switch which is in series with a respective phase of the motor which is normally closed to permit the flow of current to and from the subcircuit to the respective motor phase, a fault signal detecting means for detecting at least one fault condition and in the event of a fault condition being detected causing the switching means to open the at least one switch in at least one phase of the motor, and a snubber circuit which is associated with the respective one of the phases of the motor, the snubber circuit being so arranged that following the opening of the switch energy stored in the motor windings is diverted away from the switching means through the snubber circuit to the battery or other DC source such that the rise in voltage across the switching means terminals that occurs due to inductance of the associated motor phase winding does not exceed a predetermined level.

The energy that flows through the snubber circuit may be either dissipated by the snubber circuit or recycled back to the drive circuit, or a combination of both.

The invention therefore provides in combination, for a phase of a motor, a switching means for breaking fault current that might flow through the motor together with an energy dissipating or recycling snubber circuit that enables the energy that would otherwise have to be dissipated in the switching means to be dumped safely away from the switching means. Avalanche mode operation and/or excessive power dissipation of the switching means can therefore be avoided. This enables an economically viable switching means to be provided without the risk of failure of the switching means and high currents to be switched.

The switching means may comprise a plurality of solid state switches, with one switch being provide in series with a respective phase of the motor. Similarly, a plurality of snubber circuits may also be provided, with one associated with each switch.

Where more than one snubber circuit is provided, components and electrical paths may be shared between the circuits. For instance, there may be parallel paths of the circuit which are each associated with a respective switch, and the paths may be connected in series with a common path portion. Each of the snubber circuits may be so arranged that following the opening of the switch energy stored in the motor windings, current is diverted away from the switching means and is either dissipated by suitable means or recycled to the battery or other DC source such that the rise in voltage across the switching means terminals that occurs due to inductance of the associated motor phase winding does not exceed a predetermined level.

The switches of the switching means may comprises field effect transistors, FETs.

The snubber circuit, or each of the snubber circuits, may prevent the voltage across the associated D-S terminals of the switch exceeding a preset level equal to a level at which the switch would enter an avalanche breakdown condition.

The snubber circuit may be so arranged that with the switching means closed substantially no current will flow through the snubber circuit associated with that phase of the motor. In addition, the snubber sub-circuit arrangement may be so constructed and arranged that no undesirable single point failures or plausible multiple point failures within the circuit are introduced.

Each and every phase of the motor may be provided with a switching means and associated snubber circuit. For instance, with a three phase motor there may be three snubber circuits.

When a circuit failure is detected all of the switches may be opened perhaps simultaneously, or substantially simultaneously.

A snubber circuit may comprise, for a respective motor phase, a respective electrical path which electrically connects a node between the switching means and the respective phase of the motor to a load or an alternative part of the drive circuit. This enables energy to be dissipated in a load or recycled back to the drive circuit as may be desired.

The respective electrical path of the snubber circuit may comprise at least one electrical path from the node to a load such that the current flowing down the path flows through the load whereby the energy is dissipated. The voltage imposed across the switching means cannot exceed that of the DC link supply plus the voltage associated with the forward conduction of diodes in the snubber sub-circuit.

Alternatively, the path may connect the node to the positive or negative rail of the drive circuit such that current flowing along the path is recycled back into the battery, Each path of the snubber circuit may include at least one isolating diode oriented such that the diode only conducts current when the voltage at the switch end of the path reaches the predetermined limit, and substantially prevents the flow of current in either direction through the path when the voltage is below that level. By providing this path through a diode to a load, the voltage imposed across the switching means cannot exceed that of the battery or other DC supply plus the voltage associated with the forward conduction of the diode in the path of the snubber sub-circuit.

There may be more than one diode connected in series in each path from a node to the load or positive or negative rails, each of which are forward biased in the same direction. Where multiple snubber circuits are provided they may comprise a path containing at least one diode which is specific to each snubber circuit, and at least one further serially connected diode which is shared by all the snubber circuits. Thus, the complete path for any snubber circuit will pass through two or more serially connected diodes.

Two or more series-connected diodes in each snubber sub-circuit ensures that single point failures are avoided. The series connected diodes also ensure that forward conduction is avoided during normal operation with the switching means is closed.

A monitoring means may be provided which monitors the integrity of the snubber circuit or circuits. In the event that a path of the functionality of the snubber circuit or a component, such as a diode, in that path is defective, as determined by the monitoring means, the motor apparatus may be shut down. A diode may be considered defective if has become substantially open circuit, which can be determined by the monitoring means measuring the forward voltage drop across the diode or its resistance A short circuit fault would be problematic because a second short circuit fault in the snubber circuit may then lead to a undesirable dual point failure. A diode may be considered as defective if it has become substantially short circuit. In this case, the monitoring means can determine the short circuit by measuring the reverse voltage drop across the diode. An open circuit fault would be problematic because it would, effectively, disable the energy dissipating circuit presenting the risk that opening of the associated switch of the switching means could cause it to fail due to the energy it has to dissipate.

The monitoring apparatus may determine the integrity on start up, or at run time, and operation of the apparatus may be aborted if the snubber circuit is considered defective. The benefit of this is that it ensures that the system is not operated in a state whereby any attempt to open the switches of the switching means to break a DC clamp condition will be accompanied by a successful transfer of energy to the snubber circuit without damage to the switches. It also ensures that the apparatus is not operated in a state where a further fault could lead to a hazard.

The fault signal detection means may be arranged to detect all significant motor circuit fault conditions There will now be described, by way of example only, three embodiments of the present invention with reference to and as illustrated in the accompanying drawings of which:

Figure 1:
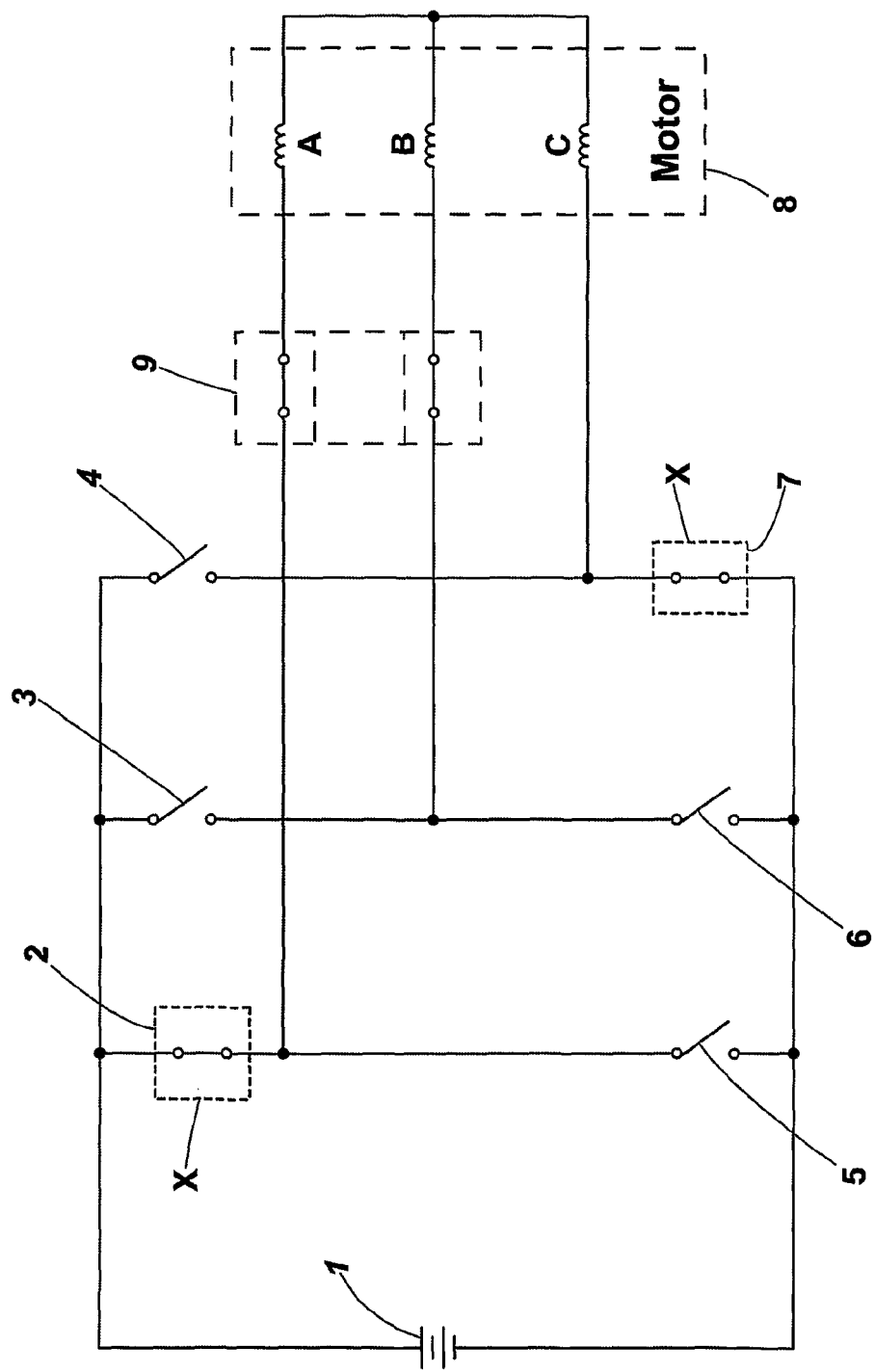
FIG. 1 is a general schematic representation of a prior art motor circuit for use in an automotive electric power assisted steering system.
Figure 2:
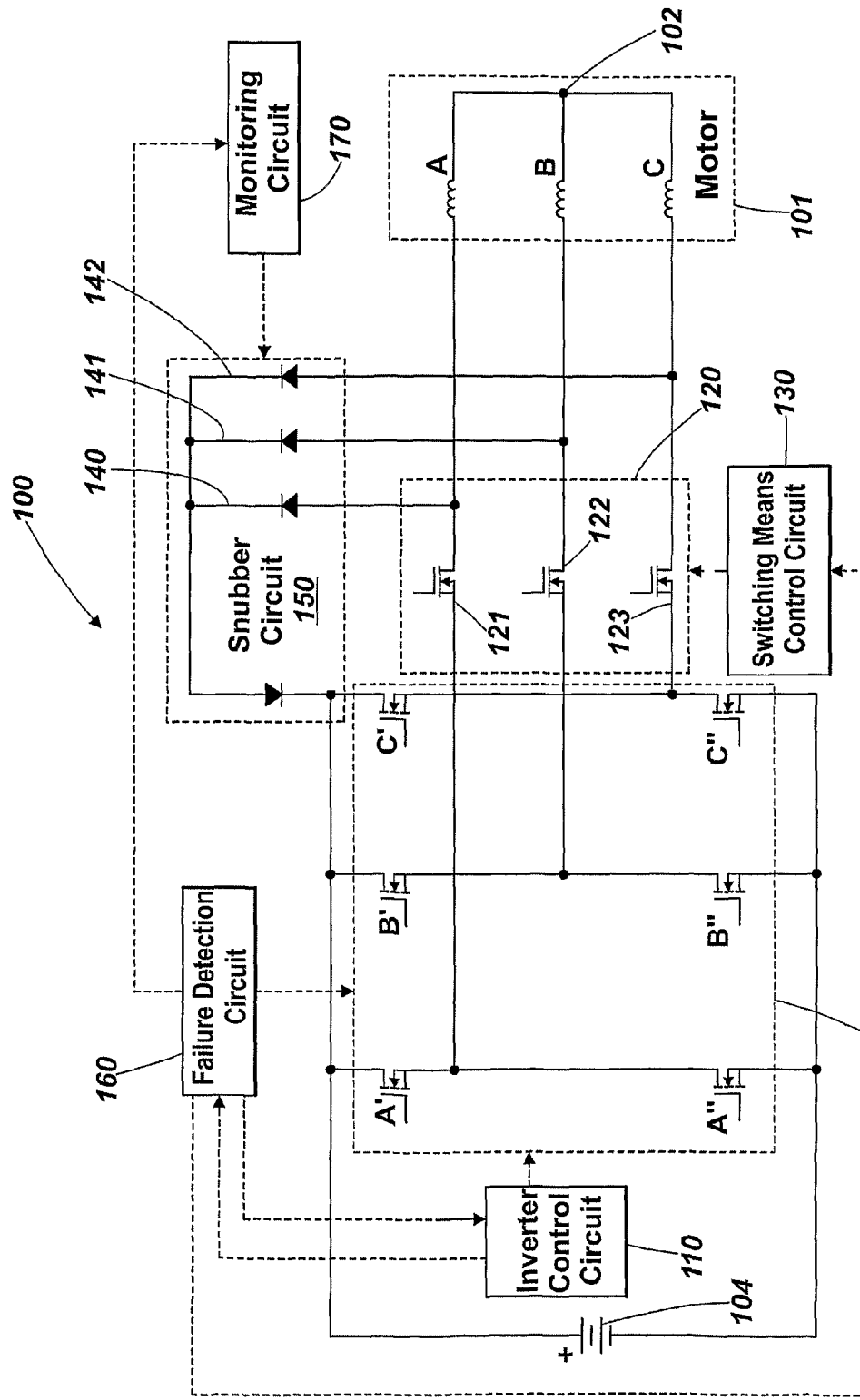
FIG. 2 is schematic of a first embodiment of the present invention in which a switching means and associated energy recycling snubber circuit is provided to enable an electro-motive clamping fault mode to be defeated.

As shown in FIG. 2 a motor circuit 100 for use in an electric power assisted steering system is shown. The motor 101 comprise a three phase motor, having three phases A, B and C connected together at a common star point 102. The ends of each phase, not connected at the star point, are connected to respective branches of a drive circuit 103 via the phase-isolation switching means. Each branch comprises an upper portion which connects the motor to a positive side of a battery supply 104 through a top FET switch A', B' or C', and a lower portion which connects the motor phases to a negative side of the battery supply through a bottom FET switch A",B" and C". The top and bottom switches in each arm enable the phase to be connected to the positive side by closing a top transistor and simultaneously opening the bottom one. They also enable it to be connected to the earth by closing the bottom transistor and simultaneously opening the top one. Similarly, they allow the phase to be left floating by simultaneously opening both the top and bottom transistors.

The opening and closing of the top and bottom transistors is controlled by a switching pattern applied to the switches by a control circuit 110 which is based upon a microprocessor and bridge driver. The pattern indicates whether each of the switches should be opened and closed at any time. Where FET switches are used as illustrated the pattern may simply comprise a positive voltage applied between Gate-Source terminals of the transistor to close it, or zero voltage between Gate-Source terminals when the switch is to be closed. The choice of switching pattern depends on the position of the motor at any given time, the desired motor torque that is to be achieved, and the desired motor speed. Provided that the motor position and speed are measured and fed to the microprocessor, together with a torque demand signal indicative of the torque required from the motor. These measurements and signals are processed by the microprocessor to produce the desired patterns. Additional signals may be used to determine the desired inverter switching pattern. Such a control circuit is well known in the art, and so will not be discussed here in any detail.

As can be seen in FIG. 2, each motor phase is connected to its respective branch of the drive circuit through a respective switch 121,122,123. Each switch comprises a FET transistor which is normally closed. The switches form part of a switching means 120 and this is controlled by some control logic (labelled as switching circuit 130) responsive to signals output from a fault detection means. In the normally closed state, each switch has no significant effect on the operation of the circuit, other than to provide a voltage drop across the closed FET. When all switches in the switching circuit are held open, current is prevented from flowing either to or from the motor 101.

In addition, associated with each switch 121,122,123 and phase is a snubber circuit 140,141,142. Each snubber circuit comprises a first portion of electrical path, each extending from a point between a respective FET and the motor phase to a second, common link, path that connects back to the positive rail of the battery. Each path and the common link path, which is shared by each snubber circuit, are therefore connected in series.

Within each of the first paths is a diode which serially connects the node to the positive rail of the battery. The common path also contains a further diode before rejoining the positive rail, so for each complete path from node to rail current has to flow through two diodes. The function of the extra diode in the second path part shared by each snubber circuit is primarily to ensure no hazardous single point failures are introduced by the snubber circuit, but also to introduce an additional voltage drop between the two ends of the path to ensure that the voltage at the switch end must exceed the battery voltage minus the drop across a top switch and the drop across the switching means FET. This ensures that during normal bridge operation, current will not flow through the snubber circuits when the switching means are closed yet will automatically start to flow when any of the switching means are opened to isolate the battery and bridge from the motor phases.

The FET switches 121,122,123 of the switching means between each branch and the respective phase of the motor prevent current flowing in the phases in the event of a fault condition arising. A fault detection means 160 or failure detection circuit, which is shown as being independent of the microprocessor of the control circuit 110, a Bridge circuit 103, Switching control means circuit 130 and Monitoring Circuit 170 are provided. The control circuit 110 controls the opening and closing of the inverter bridge FETs and fault detection means 160 monitors the behaviour of the bridge control circuit to ensure the correct open/close patterns are being applied. If it determines that the patterns are incorrect an error flag is raised.

The fault detection circuit 160 also checks the condition of the bridge switches and the switching circuit. If any of these switches are determined to be faulty, e.g. stuck closed, the error flag is also raised. The switching means monitors the condition of the error flag. When it is lowered, the switches of the switching means remain in the normal closed condition. When the error flag is raised the switching means opens the switches to isolate the motor phases from the battery. When the motor is isolated there is no possibility of the motor being clamped in place (due to a permanent battery DC current flowing through it), or resisting rotation.

It is to be noted that when the FETs 121,122, 123 are closed, during normal operation, the current from the battery 104 can flow through a closed top bridge transistor, through the closed FET and motor phase, through a second motor phase, through a second closed FET and back through a bottom bridge transistor to the negative rail. The current will not flow through the voltage limiting sub-circuits because the voltage at the switch end will be less than the potential drop across the two serially connected diodes with respect to the battery positive rail, required for conduction.

When the FETs 121,122,123 are opened, the phase is no longer connected to a voltage equal to the supply voltage minus the voltage drop across the closed bridge switches. In fact, due to the inductance of the motor windings the voltage on the phase side of the FET will in the instant following its opening rise as the FET as the current that was flowing through prior to the instant it opens attempts to continue to flow. The potential at the switch end of the FET will attempt to rise. However this will take the voltage across the FET to a level above the drop across the diode and snubber required for conduction. By limiting this rise in voltage the snubber circuit ensures the switch does not avalanche.

The limit in the rise is achieved by providing a path for current to flow from the motor phases, through the snubber circuit where it can be recycled back to the drive circuit. Current will start to flow through this path as soon as the voltage at the node exceeds the forward biasing voltage of the two serially connected diodes in each snubber circuit. In doing so, the FET is saved from a potentially damaging condition in which it avalanches. Without this path, the current will attempt to flow through the FET and the FET may be destroyed as the voltage across it is allowed to rise to a high level sufficient to cause an avalanche breakdown.

One further feature apparent in FIG. 2 is the provision of a monitoring circuit 170 which monitors the condition of the diodes in each path of the snubber circuit associated with each phase. The monitoring means checks, prior to start up of the motor, that the diodes are not in a failed condition in which the present an open circuit. If such a fault is detected the motor drive circuit is placed in a fault condition in which current is not applied to the motor. The reason for this is to ensure that the motor is not operated in such a condition that an attempt to open a switch of the switching means would risk a failure of the switch due to the inability of the snubber circuit to recycle the energy. The monitoring circuit 170 is also able to detect conditions where the diodes have failed such that they present a short circuit. If such a fault is detected the motor drive circuit is placed in a fault condition in which current is not applied to the motor. The reason for this is to ensure that the motor is not operated in such a condition that a further fault, of a second device in the snubber circuit, would lead to a hazard.

Figure 3:
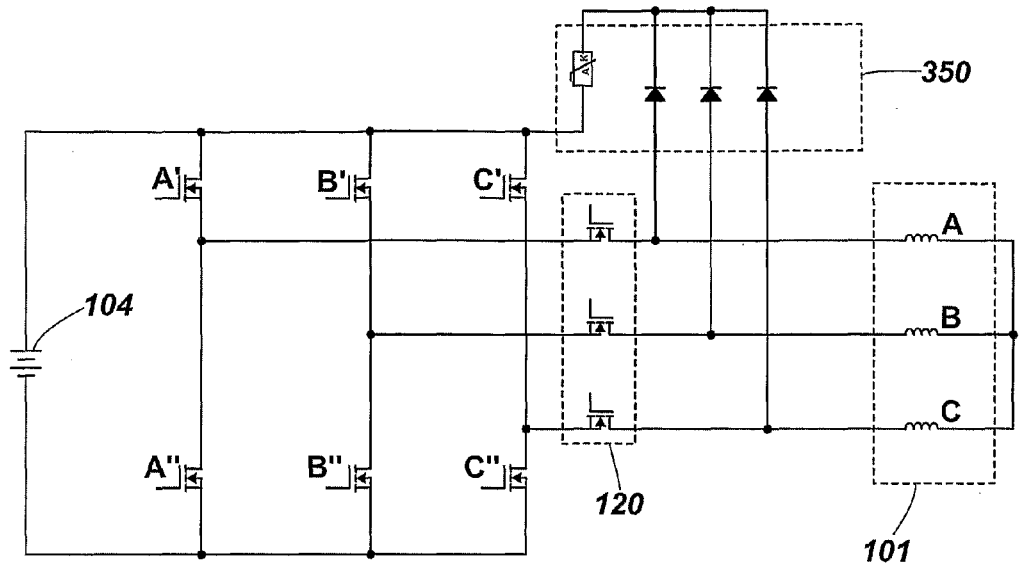
FIG. 3 is a schematic of a second embodiment of the present invention in which a switching means and associated energy dissipating snubber circuit is provided to enable an electro-motive clamping fault mode to be defeated.
Figure 4:
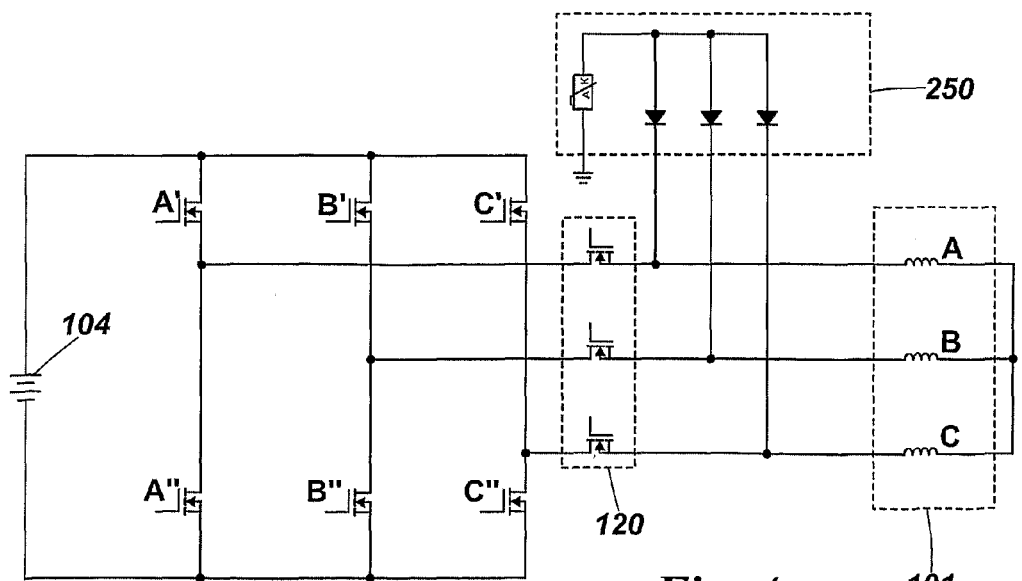
FIG. 4 is schematic of a third embodiment of the present invention in which a switching means and associated energy dissipating snubber circuit is provided to enable an electro-motive clamping fault mode to be defeated.

Several alternative arrangements are possible within the scope of this invention. FIGS. 3 and 4 provide two examples of possible variants. Parts which are the same in function as those in FIG. 2 have been labelled with the same reference numerals, and some parts of the control and drive circuitry have been omitted for clarity but can otherwise be assumed to be the same as required for FIG. 2.

FIG. 3, shows an arrangement in which energy is dissipated by the snubber circuits 350 which include a MOV serially connected to each path for each respective phase. In this case, the voltage level at the FET will be limited once it exceeds the sum of the diode voltage in a path (around 0.7 to 1 volt) and the MOV voltage (around 10 volts). Energy will be dissipated in the MOV as heat.

FIG. 4 shows an alternative form of the circuit of FIG. 3. The only significant functional difference between the operation of this motor circuit and that of FIG. 3 is that the polarity of the switching means are inverted and the snubber circuit 250 is biased towards the battery negative rail. The motor circuit otherwise functions in a very similar manner, with energy being either dissipated or re-cycled to the battery via the negative rail when the switching means opens. Features such as the control circuit and fault detection means and monitoring means are omitted from this figure for clarity but it is to be understood that they function in a manner as proposed for the embodiment of FIG. 2.

Of course, whilst FIG. 3 shows the energy across the opening FET being diverted through the connecting paths to an MOV load, it is possible to divert this energy in other ways within the scope of the invention.

The invention claimed is:

1. A motor circuit comprising:
    a positive supply rail for connection to a positive side of a battery,
    a negative supply rail for connection to a negative side of said battery,
    a motor control circuit which generates control signals,
    a motor drive circuit comprising a plurality of motor drive subcircuits which each selectively permit current to flow into or out of a respective phase of a multi-phase motor connected to said motor circuit in response to said control signals,
    a switching means comprising at least one switch which is in series with a respective phase of said motor and a respective subcircuit which is normally closed to permit a flow of current to and from said subcircuit to said respective motor phase,
    a fault signal detector for detecting at least one fault condition and in the event of a fault condition being detected causing at least one of said switches in at least one phase of the motor to open, and
    a snubber circuit which is associated with said respective one of said phases of said motor, said snubber circuit being so arranged that following the opening of said at least one switch energy stored in said motor windings is diverted away from said switching means through said snubber circuit to said battery such that the rise in voltage across said switching means that occurs due to inductance of said respective associated motor phase winding does not exceed a predetermined level.

2. A motor circuit according to claim 1 in which the energy that flows through said snubber circuit is either dissipated by said snubber circuit or recycled back to said drive circuit, or a combination of both.

3. A motor circuit according to claim 1 wherein said switching means comprises a plurality of solid state switches, with one switch being provided in series with a respective phase of said motor.

4. A motor circuit according to claim 1 wherein a plurality of snubber circuits are provided, with one associated with each switch.

5. A motor circuit according to claim 1 wherein said at least one switch of said switching means comprises a field effect transistor.

6. A motor circuit according to claim 1 wherein said snubber circuit is so arranged that with said at least one switch of said switching means closed substantially no current will flow through said snubber circuit associated with said respective phase of said motor.

7. A motor circuit according to claim 1 wherein every phase of said motor is provided with a switching means and associated snubber circuit.

8. A motor circuit according to claim 1 wherein said snubber circuit comprises, for a respective motor phase, a respective electrical path which electrically connects a node between said switching means and said respective phase of said motor to a load.

9. A motor circuit according to claim 8 wherein said path connects said node to a positive rail or negative rail of said drive circuit such that current flowing along the path is recycled back into said battery.

10. A motor circuit according to claim 8 wherein each path of said snubber circuit includes at least one isolating diode oriented such that said isolating diode only conducts current when the voltage at the end of said path nearest said switch reaches a predetermined limit, and substantially prevents the flow of current in either direction through said path when the voltage is below that predetermined level.

11. A motor circuit according to claim 10 wherein there is more than one diode connected in series in each path from a node to said load or to said positive rail or negative rail, each of which are forward biased in the same direction.

12. A motor circuit according to claim 8 wherein said respective electrical path of said snubber circuit comprises at least one electrical path from said node to a load such that the current flowing down said path flows through said load whereby the energy is dissipated.

13. A motor circuit according to claim 1 which includes a monitoring means which monitors the integrity of said snubber circuit.

\* \* \* \* \*